US006766984B1

United States Patent
Ochoa

(10) Patent No.: US 6,766,984 B1
(45) Date of Patent: Jul. 27, 2004

(54) STIFFENERS FOR AIRCRAFT STRUCTURAL PANELS

(75) Inventor: Carlos M. Ochoa, Dallas, TX (US)

(73) Assignee: Icom Engineering Corporation, Dallas, TX (US)

( * ) Notice: Subject to any disclaimer, the term of this patent is extended or adjusted under 35 U.S.C. 154(b) by 0 days.

(21) Appl. No.: 09/829,568

(22) Filed: Apr. 10, 2001

Related U.S. Application Data

(63) Continuation-in-part of application No. 09/707,657, filed on Nov. 7, 2000, which is a continuation-in-part of application No. 09/389,163, filed on Sep. 2, 1999, now Pat. No. 6,250,361, which is a continuation-in-part of application No. 09/263,684, filed on Mar. 5, 1999, now Pat. No. 6,082,429, which is a continuation-in-part of application No. 09/116,689, filed on Jul. 16, 1998, now Pat. No. 5,954,111.

(51) Int. Cl.[7] .................................................. B64C 1/00
(52) U.S. Cl. ........................................................ 244/119
(58) Field of Search ............................ 244/117 R, 119, 244/123, 131, 132

(56) References Cited

U.S. PATENT DOCUMENTS

| 1,827,181 | A | * | 10/1931 | Alfaro |
| 2,251,967 | A | * | 8/1941 | Yoder |
| 3,071,217 | A | * | 1/1963 | Gould |
| 3,600,016 | A | * | 8/1971 | Dilley |
| 3,976,269 | A | | 8/1976 | Gupta |
| 4,635,882 | A | * | 1/1987 | SenGupta et al. |
| 4,828,202 | A | * | 5/1989 | Jacobs et al. |
| 5,165,627 | A | * | 11/1992 | Amano et al. |
| 5,448,865 | A | | 9/1995 | Palmersten |
| 5,451,377 | A | | 9/1995 | Asher et al. |
| 5,893,534 | A | | 4/1999 | Watanabe |
| 5,954,111 | A | * | 9/1999 | Ochoa |
| 6,082,429 | A | * | 7/2000 | Ochoa |
| 6,250,361 | B1 | * | 6/2001 | Ochoa |
| 6,364,250 | B1 | * | 4/2002 | Brinck et al. |

* cited by examiner

Primary Examiner—Blair M. Johnson
(74) Attorney, Agent, or Firm—Browning Bushman, P.C.

(57) ABSTRACT

An aircraft structural panel (10) of the skin-stiffener type such as is commonly used in aircraft construction, has a skin (15) supported by uniformly spaced stiffeners or frames (39). Stiffeners (39) are secured to skin (15) and extend outwardly from the associated skin (15). Each stiffener (39) has a horizontal body (38), an inner mounting flange (41), and an outer bowed flange (42). Mounting flange (41) and bowed flange (42) have free edges and respective inturned beads or curls (44, 46) are formed thereon for stiffening of flanges (41) and (42).

22 Claims, 4 Drawing Sheets

STIFFENERS FOR AIRCRAFT STRUCTURAL PANELS

REFERENCE TO RELATED APPLICATION

This application is a continuation-in-part of application Ser. No. 09/707,657 filed Nov. 7, 2000; which is a continuation-in-part of application Ser. No. 09/389,163 filed Sep. 2, 1999, U.S. Pat. No. 6,250,361; which is a continuation-in-part of application Ser. No. 09/263,684 filed Mar. 5, 1999, now U.S. Pat. No. 6,082,429 dated Jul. 4, 2000; which is a continuation-in-part of application Ser. No. 09/116,689 filed Jul. 16, 1998, now Pat. No. 5,954,111 dated Sep. 21, 1999.

FIELD OF THE INVENTION

This invention relates generally to a reinforcing support structure for aircraft structural panels of the skin-stiffener type, and more particularly to stiffeners mounted on aircraft panels.

BACKGROUND OF THE INVENTION

Over the past several years aerospace design engineers have been challenged to address ever higher payload requirements. This has occurred in parallel with weight reduction and other structural efficiency goals that have driven the industry. Ever present safety and structural integrity demands have led the industry to look for more efficient and effective structural members and configurations that are more robust while addressing weight concerns.

Generally speaking, a stiffened aircraft panel's load-carrying capability is directly related to the type and strength of the stiffener typically installed on one side of the panel. The current approach within the industry to meet higher competitive demands has ranged from resorting to sophisticated alloys including extrudable aluminum and other alloys. It has also included such approaches as using specialty fiber reinforced composite structures, and increasing the depth of conventional stiffener designs as well as the yield strength of the material used in making the stiffeners. In order to appreciate the uniqueness and novelty of the current invention, a better understanding of the current state of the art in addressing the above airframe requirements follows. The first, and most common, approach taken by the industry in addressing the higher requirements has been to make conventional stiffeners out of heavier or higher strength materials. These traditional stiffener designs include the C-channel stiffener and Z-shaped stiffener, as well as the hat-shaped stiffener. Heavier gauges such as 0.055 inch min. (17 gauge) to 0.070 inch min. (15 gauge) material are now common. The use of thicker material has not only lead to greater tooling and handling costs, but also as will be shown, has had the effect of creating other major problems simultaneously.

The aircraft structural panel including any attached stiffeners is a system of parts interacting with each other as they are acted upon by combinations of pressures and in-plane as well as bending loads. Currently, stiffened-panel aircraft structures found in the wings, empennage, and fuselage of aircraft are typically constructed using aluminum or fiber reinforced composite skins with aluminum stiffeners and titanium members, or stiffeners using fiber reinforced composites.

These panels may also be supported by metal stiffeners to provide greater support as the stiffened panel system sustains bending moments as well as in-plane and pressure forces during service. However, an incompatibility occurs when relatively thick, stiffer sections, i.e., stiffeners made of 0.55 inch min. to 0.070 inch min. material are joined or fastened to thinner, less stiff sections, i.e., stringers made of 0.023 inch min. to 0.038 inch min. material. The area where these two sections are joined is an area of load transfer and thus of relatively higher stress. The reason for this is that the stiffer section resists conforming to the deformation of the less stiff stringer sections as loads are increased. The result is that one part of the system, the stringers, try to slide relative to another part of the system, the stiffener. This may result in early failure of the system, such as by buckling of the stiffener or of the stringer. This is due to in-plane compressive loads that result from the constraint that the stiffener imposes on the adjacent members as the loads are increased. Because of the increased stress at the joining area, manufacturers have been forced to modify parts of the stiffened panel to offset this effect. For example, because the use of heavier stiffeners increases the shear load through the joining area or fasteners, especially on the outer extremes of the panel width (near the panel edges), heavier panels and mounting members have had to be introduced. Still another approach to alleviate the problem has been to use additional shear ties or fasteners. This has been implemented in an attempt to reduce the high local in-plane compressive stresses that the heavy stiffeners may impose on the panel skin. However, this approach is undesirable because by increasing the number of parts, it increases the complexity and cost of the system.

This approach requires still heavier stiffeners, since the stiffener failure risk is somewhat reduced when it acts as an independent component rather than as part of a fully integrated system. Another drawback to additional shear ties is that it requires substantially more parts and installation time.

The second approach generally taken by the industry is to make the current hat-shaped and C-channel stiffeners deeper and out of thinner, yet higher yield strength material. This offers the advantage of reducing in-plane stress as noted above while at the same time increasing bending stiffness due to the deeper configuration. However, this approach has major disadvantages.

First, the thinner materials used in these traditional stiffener configurations make these stiffener sections more susceptible to edge stress concentrations. The conventional C-channel, Z-shaped, and hat-shaped stiffeners have a "blade edge." This edge is very susceptible to imperfections in the sheet material along this edge as well as to damage during manufacture, shipping/handling and installation. These imperfections along the blade edge become stress concentration points or focal points at which failure of the stiffener can initiate. A more detailed description of this failure initiation follows.

Even the most perfect, smooth edge of the conventional stiffener will experience a very localized point of high stress gradient due to the characteristic edge stress concentration associated with open sections under bending loads.

Thus, initiation of an edge "bulge" or "crimp" on a perfect smooth edge is nothing more than the creation of an edge imperfection that is large enough to grow or "propagate" easily. It is significant that this stress concentration may be made worse by the presence of any relatively small local edge imperfections, even those on the order of size of the thickness of the stiffener material itself.

These imperfections near the edge can be in the form of edge notches, waviness (in-plane or out-of-plane), local thickness variations, local residual stress variations, or variations in material yield strength. Where multiple imperfections occur together, they may all compound together to further increase the stress concentration effect, and thus lower the load level at which failure is initiated. Thus, the existence of any edge imperfections in a conventional stiffener has the effect of enhancing an already established process of failure initiation.

Second, all the above conventional stiffeners, when manufactured out of relatively thin sheet materials are more susceptible to buckling due to the reduced thickness. Buckling is an instability in a part of the stiffener associated with local compressive or shear stresses. Buckling can precipitate section failure of the stiffener. This in turn causes a stress concentration in the adjacent panel skin near the buckled stiffener section, which may cause the stiffened panel to fail.

Finally, some thinner conventional stiffeners can experience "rolling" when placed under load. Rolling may be caused when the shear stresses within the stiffener result in a net torque about the centroid of the thin walled cross-section thus causing the cross-section to twist, possibly making the stiffener unstable. Another cause of rolling is the curvature of the panel itself that is induced by in-plane or pressure loads that are imposed upon the stiffened panel. Some airframers have increased the cross-sectional length of the flange furthest from the panel skin of the conventional C-channel stiffener in their attempts to solve the rolling problem, but have been met with only marginal improvement. This is because the increased flange length has had the simultaneous effect of increasing the distance from the centroid to the shear center of the channel. Additionally, increasing the cross-sectional flange length caused difficulty in accessing the fastener areas used in mounting the C-channel to the stiffened panel.

The use of solid bulb flange-edges for extruded stiffeners has surfaced as another attempt to address aircraft stiffener needs. However, due to the relative material inefficiency of providing such a solid, mass-intensive edge section, as well as the limitation to specific extrudable aluminum alloys, this solution has not gained extremely wide usage. Because of the higher load requirements of current aircraft, and problems such as the fastening of relatively thick sections to sections relatively less thick, there is a need within the industry today for a new stiffener configuration that can address all of the above mentioned drawbacks and shortcomings of the present state of the art, is suitable for use with substantially all standardized stiffened panel structures, and can be made on a cost-effective basis.

SUMMARY OF THE INVENTION

The present invention alleviates and overcomes the above-mentioned problems and shortcomings of the present state of the art through a novel aircraft structural panel stiffener. The novelty and uniqueness of this invention are that it: 1) may be made of thinner material to reduce the in-plane stresses found in the joining area, 2) resists loads adequately to meet new requirements, 3) is resistant to buckling and rolling, 4) effectively addresses edge stress concentrations by modifying the blade edge to an area of relatively low stress, and 5) can be manufactured cost effectively by using conventional manufacturing methods.

This novel invention may be described as a substantially reconfigured or stabilized J-stiffener having a mounting or stabilizing flange. It should be noted here that due to their extreme susceptibility to rolling, conventional J-stiffeners are seldom used in aircraft structural panels. The unexpectedly strong synergisms of the unique characteristics found in the stabilized J-stiffener not only address the above problems, but simultaneously obtain significant material savings. More particularly the synergisms may be described as follows.

The instant invention has substantially redistributed material at critical locations as compared with conventional stiffener configurations. This material redistribution has the effect of altering considerably the behavior of the stiffener as compared with conventional J-stiffeners and other stiffener configurations.

The material redistribution required to accomplish these collaborative effects is accomplished by having specifically placed free edge portions, which are turned inwardly to define tubular beads or curls along the free edges. Moreover it is not just the presence of the tubular bead or curl that enables the substantial level of synergism, but the discovery of specific ratios of curl diameter to other stiffener dimensions that maximize these synergisms even to the extent of obtaining significant weight savings.

Two sets of synergisms combine to make the present invention successful. The first set of synergisms is directly related to the ratio of the diameter of the curl to the stiffener section flange length and web length. Each tubular bead has a cross-sectional dimension which when combined in specific ratios with other stiffener dimensions substantially maximizes the moment of inertia of the overall section about the horizontal and vertical axes with a minimal use of material. Moreover, the tubular bead size specified by these same ratios has the effect of altering the characteristic failure mode normally associated with the free edge stress concentration for conventional stiffeners as described above. Finally, the cross-sectional dimension of the tubular beads of the stabilized J-stiffener make the novel stiffener less sensitive to edge imperfections and damage because the blade edge has now been placed in a position of relatively benign stress levels so that imperfections or damage to the tube or edge region have to be on the order of size of the diameter of the curl in order to have significant detrimental effect to the stiffener section.

Having established the above ratios, a second set of synergisms was discovered by directly combining the above with specific ratios of the stiffener's cross-sectional web dimension to cross-sectional flange dimension. The compounding effect of the first set of synergisms with this additional set of ratios makes the stabilized J-stiffener more resistant to rolling and buckling and thus avoids the problems that plague deeper conventional structural panel stiffeners using thinner gauge material. Additionally these compounding synergisms make this stiffener unique in that stresses are now more evenly distributed in the flanges thus making the stiffener more stable and less sensitive to dimensional imperfections. Because of these cooperative effects, the stabilized J-stiffener demonstrates its uniqueness and efficiency in using thinner gauge material to reduce in-plane stresses found in the joining area, thus allowing the panel and stiffener to work together as a more cohesive system instead of as individual components.

Because the stabilized J-stiffener effectively addresses the problem of in-plane stresses in the area nearest the panel skin, the use of fewer fasteners may be considered. Thus, the airframer may now uniquely rely upon a single stiffener design to address the stiffening of a wide variety of structural panel constructions.

When compared to conventional stiffeners on the market today, the stabilized J-stiffener uses substantially thinner material while obtaining better resistance to service loads.

Thus, even though additional slit width (width of the sheet of material from which the stiffener is made) is required to reposition needed material, the use of thinner gauge material more than offsets the additional slit width, bringing overall material savings as high as 15% in some instances. This innovation in system configuration represents an additional cost savings for the airframer, since material cost is a significant portion of total manufacturing cost of stiffened panel structures. Thus, this unique and novel stiffener is cost effective.

For manufacturing process cost efficiency, the tubular bead is preferably an open-section bead, meaning for example that the sheet material may be formed in an almost complete bend or curl, but the curl need not be closed near its outer edge, such as by welding, bonding, or joining. A closed section tubular bead would work equally well, at a slightly higher fabrication cost.

This edge feature is discussed in more detail as follows. The mounting flange curl and the trough curl are tubular features, preferably open-sections, that are made by shaping the free edges or edge marginal portions of the stiffener cross-sections into an elliptical, preferably circular, cross-sectional shape. As used herein, a circular cross-section is considered to be a special case of an elliptical cross-section. The term "characteristic diameter" refers to a constant diameter in the case of a circle, while other elliptical shapes will have major and minor axes or diameters, with the minor axis or diameter being the "characteristic diameter."

Even though some configurations of a slightly non-circular elliptical shape may be more desirable in some applications, the circular cross-section is generally preferable, because it is simpler to manufacture, while still achieving the desired benefits to a significant degree.

It is important to contrast the edge curl approach against other possible edge treatment approaches by noting that the dimensional order of size effect related to imperfections or damages described above for the curl can not be achieved by simply folding the edge over, either once or multiple times, because in this case the characteristic dimension with respect to the local stresses, will be defined by the fold edge diameter and not by the length of overlap of the fold. This is because the overlap direction is transverse to the edge and quickly moves out of the peak stress region, and because the edge fold diameter defines the maximum distance over which the edge stresses may be effectively spread.

The elliptical or circular open-section tubular shape or "edge curl" is contrasted to tubular sections of rectangular cross-sectional shapes, including folded edges, and to open-section tubular shapes of softened corner polygon cross-sectional shapes in that the characteristic diameter with respect to the local stresses, will be defined in each of these other cases by the fold diameter or by the softened corner diameter nearest to the stiffener edge, as opposed to the overall diameter of the edge curl section.

It may be noted that in this context a rectangular or polygonal cross-section with very softened corners or curved sides is in effect an imperfect ellipse or circle.

In some instances, quasi-elliptical or quasi-circular cross-sections, imperfect ellipses, and imperfect circles, in the form of polygon cross-sections with very softened corners may function adequately, but may also be more difficult to fabricate and will be less effective than a generally circular curl. In other cases, the tubular edge may be formed by lapping the edge over itself one or many times in order to achieve specific design objectives within the teachings of the present invention.

Other variations are obtained by including local offsets or adding material locally such as by bonding or welding strips of material or high strength fibers or wires. Still other variations include local modifications to the material such as by heat, electromagnetic, chemical, or deformation treatment of the tubular bead cross-section or of adjacent regions. In spite of the potential for additional fabrication costs, some of the above variations may at times be desirable, for example in local regions where the designer desires local regions of modified cross-sectional shape for space claim, interfacing, or joining reasons. In some applications the curl may be formed by turning the edges through an arc of up to 360 degrees, 720 degrees, or even more, so that the edge loops over one or more times on itself, in order to concentrate mass locally or to address other design objectives. In these cases manufacturing economy and complexity are also considerations.

The resulting synergistic effect of the stabilized J-stiffener's material efficiency in obtaining the desired bending rigidity or moment of inertia, the alteration of the characteristic failure mode, the reduction in sensitivity to edge imperfections and damage, resistance to buckling and rolling as well as the ability to spread stresses more uniformly has the same degree of compounding advantage as the conventional stiffener's compounding disadvantage of low resistance to buckling and rolling combined with sensitivity to relatively small edge or dimensional imperfections.

Accordingly, it can now be appreciated by those versed in this art, that the novel stabilized J-stiffener of the instant invention provides a solution to the problems that the airframe stiffened panel art has sought to overcome. Areas of viable application include stiffened panel applications in wing, empennage, and fuselage areas, where they may be used as frame structural members. In these applications the stiffeners are usually installed such that they project in a direction substantially perpendicular to the surface of the panel skin with which they are associated.

In summary, the stabilized J-stiffeners of the present invention having inner stabilizing flanges are uniquely designed to be compatible with substantially all standard stiffened panel configurations, thereby significantly reducing the number of stiffeners and panel frame members that airframers must carry in their inventories and employ, to permit more stringent design criteria to be met, and to permit this to be done without major modification of other associated hardware.

The following description of the present invention may incorporate dimensions that are representative of the dimensions that will be appropriate for most commonly found stiffened panels. Recitation of these dimensions is not intended to be limiting, except to the extent that the dimensions reflect relative ratios between the sizes of various elements of the invention, as will be explained where appropriate.

It is an object of the invention to provide stiffeners for aircraft panels of a minimum weight while maintaining strength requirements.

BRIEF DESCRIPTION OF THE DRAWINGS

FIG. 2 is a perspective of a portion of the stiffened aircraft panel shown in

FIG. 1 showing a vertically extending stiffener secured to the stiffened panel section;

DESCRIPTION OF THE INVENTION

Figure 1:
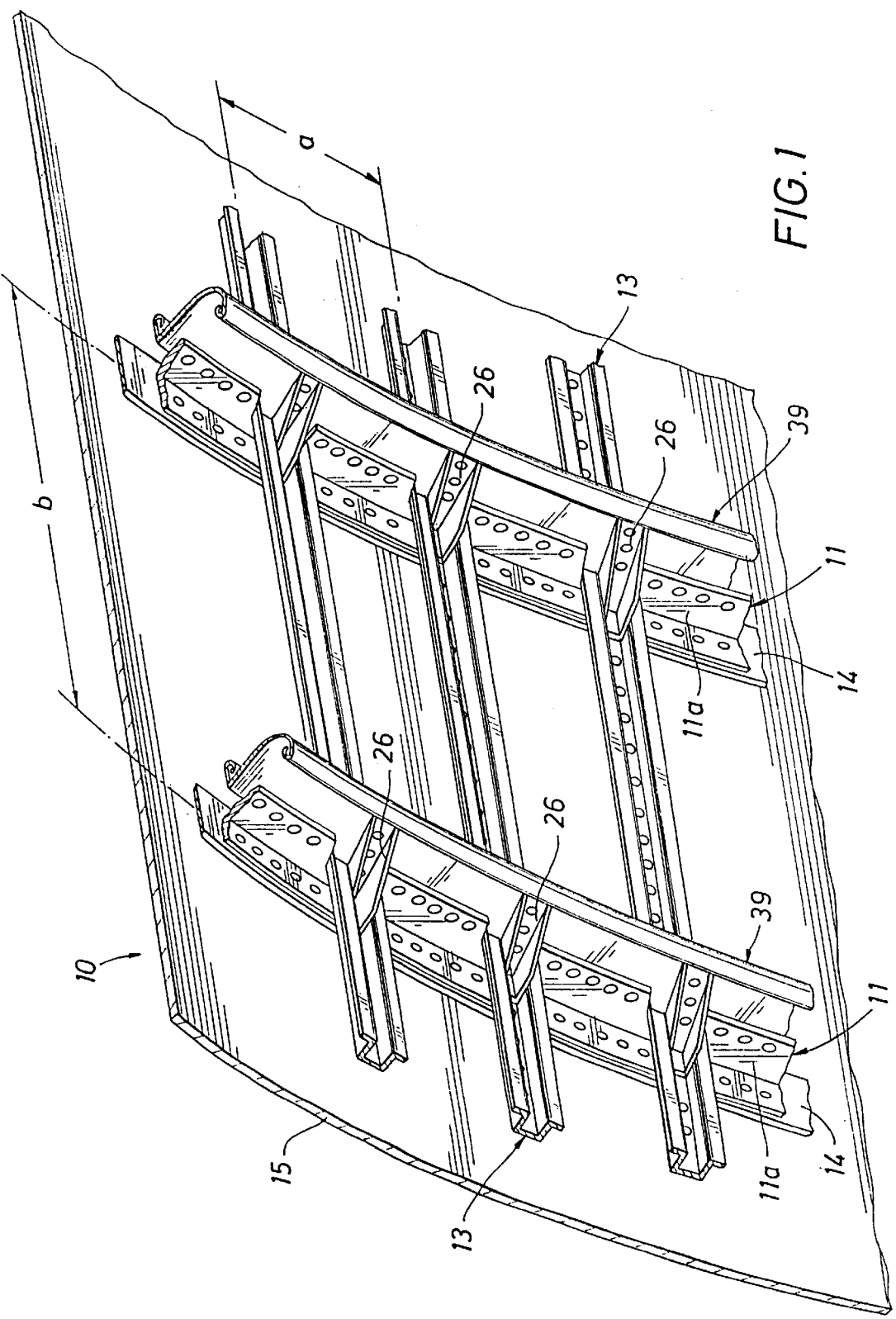
FIG. 1 is a perspective of the inner side of a stiffened aircraft panel with stabilized J-stiffeners of the present invention mounted on the stiffened panel.
Figure 2:
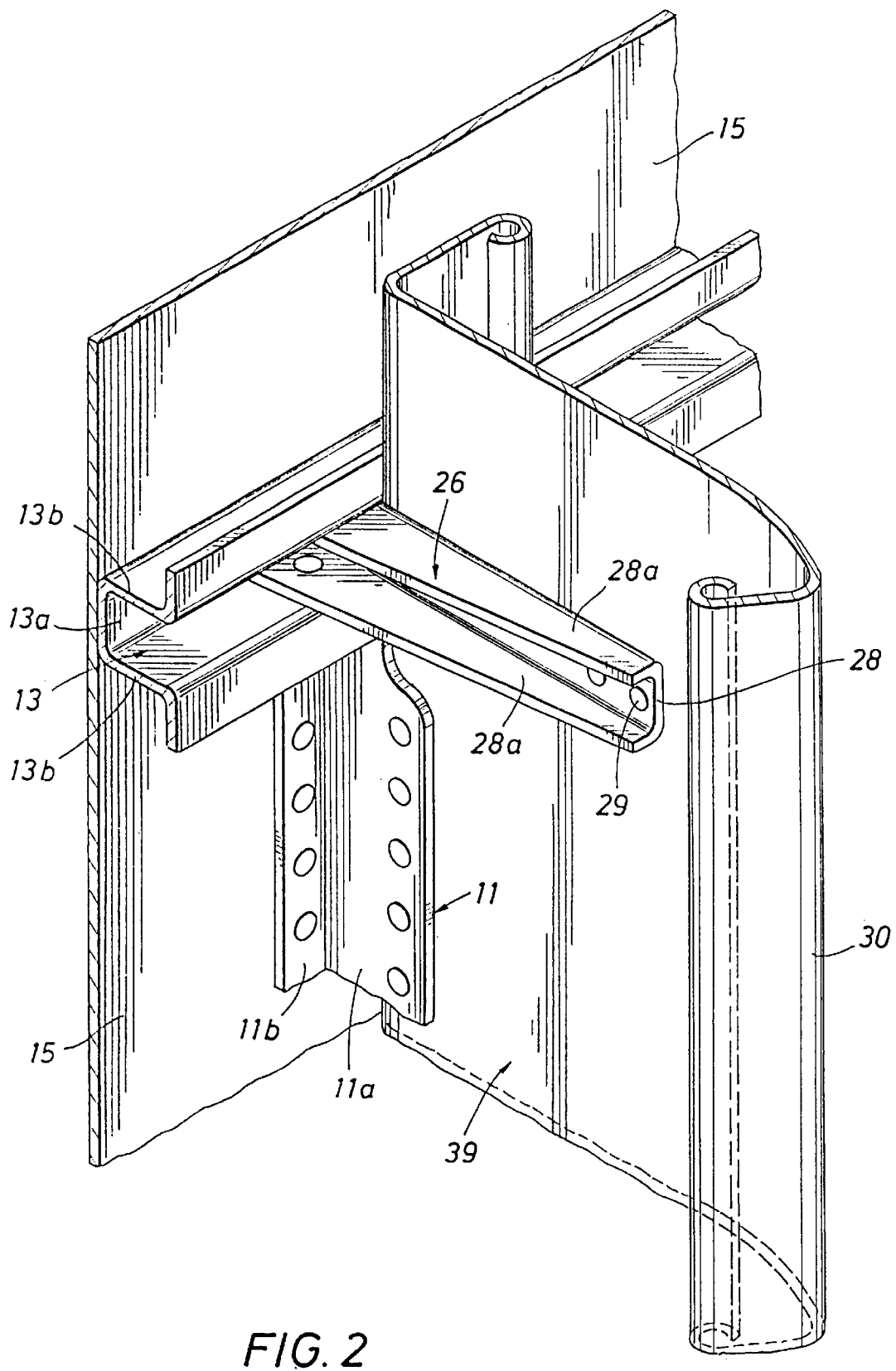

Referring now to the drawings for a better understanding of this invention, and more particularly to the preferred embodiment shown in FIGS. 1–4, a stiffened structural panel or panel structure, is shown generally at 10 including an outer skin 15 for installation onto or as an integral part of an aircraft structure such as a fuselage, where the fuselage is reinforced by stringers 13 that run longitudinally through the fuselage and stiffeners or frames 39 that run circumferentially about the fuselage. Stiffeners 39, when secured about a fuselage, are commonly referred to as frames.

Occasionally in this disclosure that portion of the skin 15 which is bounded by adjacent stiffeners or frames 39, in this case a rectangular section having sides of lengths a and b, is referred to as a structural sub-panel. Also, adjoining sub-panels are occasionally referred to collectively as a panel or a structural panel. A typical sub-panel the skin. Stringers 13 may be channel-shaped defining a web 13a and flanges 13b having lipped edges. Skins 15 in this preferred embodiment are contoured, chemical milled aluminum aircraft skins. In other embodiments the skins may be made of alternate materials such as fiber reinforced materials. When frames or stiffeners 39 are not attached directly to the skin 15, such as in this embodiment, they may be attached using shear ties 11 and a plurality of stringer clips 26 that are positioned in the channel of each stringer 13. Shear ties 11 are angle shaped to define legs 11a and 11b and fit between stringers 13. Leg 11a may be riveted to stiffener 39 and leg 11b may be riveted to skin 15. In addition, fail-safe straps 14 between skin 15 and leg 14b may be present. Each stringer clip 26 may be channel shaped, having a web 28 and planar side flanges 28a. Web 28 is riveted at 29 to stiffener 39 of the present invention. Side flanges 28a fit within stringer 13 and normally are riveted to stringer 13. Stringer clip 26 has a flat surface 28 that is designed to lie on one of the same station planes on which the shear tie surfaces lie. Frame or stiffener members 39 thus have a curved contour that is roughly the same as the desired contour of the aircraft fuselage. This contour may be obtained by stretch-forming stabilized J-stiffener 39 to the desired shape. During this operation the tubular beads help the stresses to be more evenly distributed, thus giving more uniform deformation over the section of the stiffener.

It is typically critical to good design that the protruding leg 11a of the shear ties 11 and the flat mating surface of web 28 of stringer clips 26 lie within tolerances as tight as 0.010 inch from their station planes, and that the alignment of the station planes between panels is within tolerance limits, so that the frame members or stiffeners 39 may be fastened to the panels and joined in alignment without the use of shims and without stressing the panel. The stringers 13, the shear ties 11, and the stringer clips 26 must thus be fastened to the skin 15 with extreme accuracy and consistency. This accuracy of parts manufacture insures that the aircraft will be assembled with no prestressed parts and no cosmetic imperfections.

The present invention improves the dimensional stability of stiffeners 39 by significantly stabilizing the cross-section during forming operations, as well as during subsequent handling and installation. In addition, the improved damage resistance of these structural components stabilizes and strengthens the members during such operations as clamping and drilling, as the members are mounted in fixtures and assembled.

Stiffener 39 is generally of a J-shaped configuration with a mounting or stabilizing flange. Note that since many of the functions of mounting and stabilizing result in similar design geometries, these two words may be used interchangeably in the present context. As shown in the drawings, stiffener 39 may be commonly formed of a sheet material such as aluminum alloy or a fiber reinforced material. It comprises in the panel shown in FIG. 1 a generally radial body 40, an integral mounting or stabilizing flange 41 generally at right angles to body 40, and an integral outer bowed flange 42. The opposed free edge portions of stabilizing flange 41 and bowed flange 42 are turned inwardly to form open-section tubular beads or edge curls 44 and 46. An open gap 48 is formed adjacent each tubular bead 44, 46. Tubular beads 44, 46 are shown as being of circular configurations or shapes in cross section and have outer diameters indicated at d and d1. Tubular beads 44, 46 are turned inwardly an angular amount A of about 270 degrees from the flange 41 and bowed flange 42 as shown in FIGS. 3 and 4 particularly.

Thus, gap 48 is of an angular amount about 90 degrees. If desired, tubular beads 44, 46 could be closed although 270 degrees has been found to be optimum. An angular or circular shape for beads 44, 46 as small as about 210 degrees would function in a satisfactory manner in most instances.

While a circular shape for tubular beads 44 and 46 is preferred, a non-circular elliptical shape would function adequately in most instances. A tubular bead or curl of an elliptical shape has a major axis and a minor axis. Diameter or dimension d or d1 for an elliptical shape is interpreted herein for all purposes as the average dimension between the major axis and the minor axis. The major and minor axes are at right angles to each other and are defined as the major and minor dimensions of the open or closed tubular section. To provide an effective elliptical shape for tubular beads 44 and 46, the length of the minor axis should be at least about 40 percent of the length of the major axis. The terms "elliptical" shape and "elliptical" cross section are to be interpreted herein for all purposes as being generic to and including circular shapes and circular cross sections. Preferably, diameter d1 for bead 46 is larger than diameter d for bead 44 in a non-circular elliptical shape. Bowed flange 42 is generally bowl shaped and has an outwardly sloping wall portion 50 extending downwardly from horizontal body 40 to an actuate apex 52 which may be flattened in order to accommodate fastening to or interfacing as the panel is joined with other structural components. As shown in FIG. 3, an integral inwardly and downwardly sloping wall portion 54 extends from actuate apex 52 to bead 46.

Figure 3:
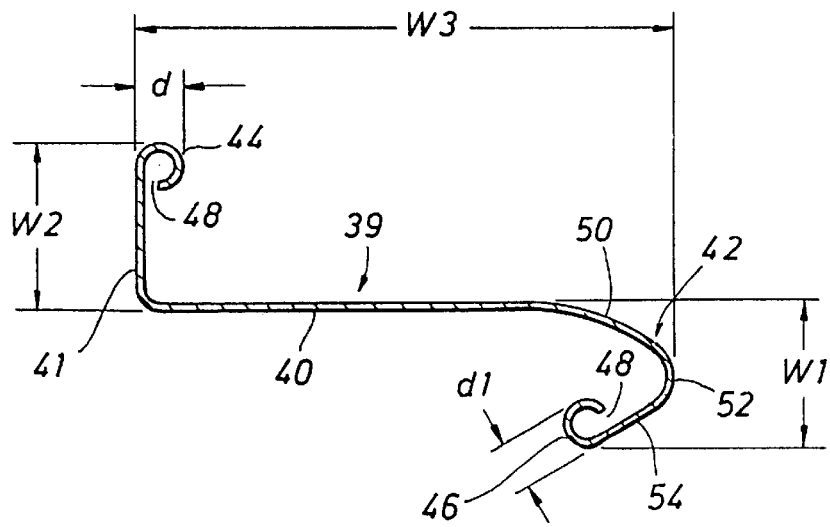
FIG. 3 is an enlarged section of the stiffener removed from the panel section.
Figure 4:
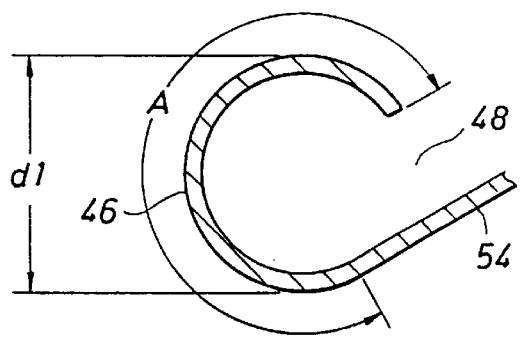
FIG. 4 is an enlarged sectional view of a bead on a free end of the stiffener.

In order for tubular beads 44, 46 to provide maximum strength with a minimal cross sectional area of stiffener 39, the diameter d1 of tubular bead 46 is selected according to the width W1 of bowed flange 42 as shown in FIG. 3. A ratio of about 5 to 1 between W1 and d1 has been found to provide optimum results. A ratio of W1 to d1 of between about 3 to 1 and 8 to 1 would provide satisfactory results. A similar ratio between W2 and d for tubular bead 44 is utilized. As an example of a suitable stiffener 39, W1 is 1 inch, W2 is 1 inch, and W3 is 3½ inches. The diameter d for bead 44 is 3/16 inch and diameter d1 for bead 46 is ¼ inch.

In order to obtain the desired minimal weight stiffener, tubular curls or beads 44, 46 must be shaped and formed within precise ranges and sizes in order to provide maximum strength. Using various design formulae to determine the outer diameters of tubular curls 44, 46, an optimum outer diameter of ¼ inch was found to be satisfactory. However, it is preferred that diameter d1 for curl 46 be slightly larger than diameter d for curl 44. W1 and W2 are between about three (3) and five (5) times the outer diameter of tubular curls 44 and 46 for best results. Width W3 is between about two (2) and five (5) times widths W1 and W2 for best results. By providing such a relationship between tubular curls 44, 46 and widths W1 and W2 the moment of inertia is maximized and edge stress concentrations are minimized for stiffener 39 thereby permitting the light weight construction for stiffener 39 of the present invention. Tubular curls 44, 46 are illustrated as turned inwardly which is the most desirable. In some instances it may be desirable to have a tubular curl turned outwardly.

While stiffener 39 has been shown as mounted adjacent but not in contact with the inside surface of skin 15 stiffener 39 may, if desired, be mounted directly on the skin. Stiffener 39 may also be mounted on each panel 15, or only on selected panels 15 as desired.

Figure 5:
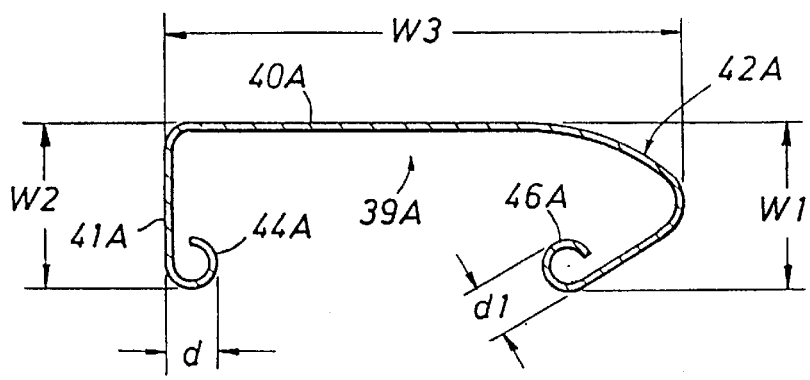
FIG. 5 is an enlarged section of a modified stiffener in which the mounting flange extends in an opposite direction from the mounting flange for the embodiment of FIGS. 1–4.

FIG. 5 shows another embodiment of a stiffener in which stiffener 39A has a mounting flange 41A extending from body 40A in the same direction as outer bowed flange 42A. Tubular curls or beads 44A and 46A together with the dimensions shown at W1, W2, W3, d, and d1 are similar to the embodiment of FIGS. 1–4. The only change in the embodiment of FIG. 5 from the embodiment of FIGS. 1–4 is the direction in which stabilizing flange 41A extends.

Figure 4A:
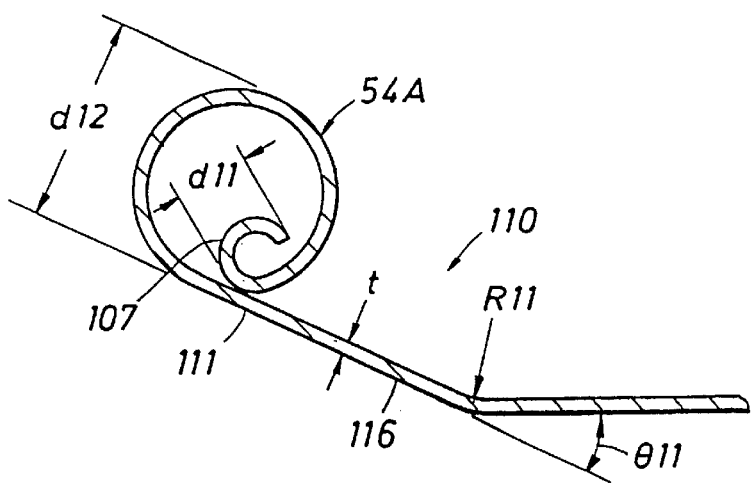
FIGS. 4a and 4b are enlarged sectional views of modified beads on a free end of a stiffener.
Figure 4B:
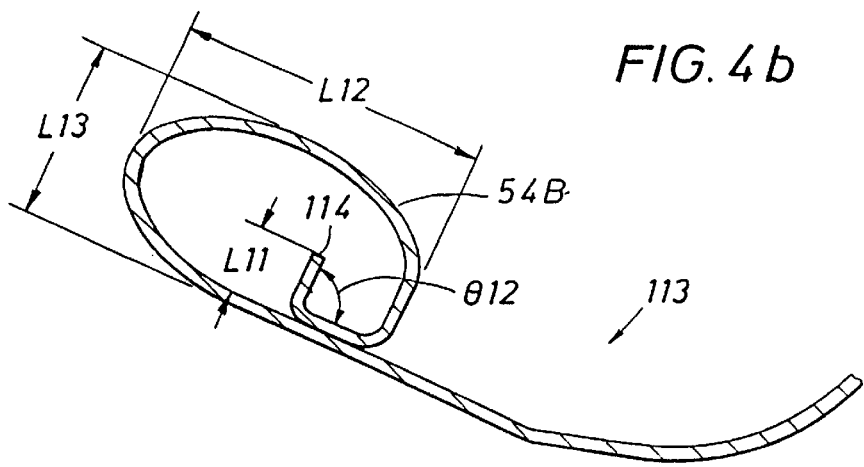

FIGS. 4a and 4b show two embodiments of alternative tubular edge features to that of FIG. 4. Each of these two embodiments is directed to a bead or curl in which the outer diameter to thickness ratio of the tubular edge is larger than about 15. In these cases, additional stiffening of the tubular edge may be desired. As shown in embodiment 110 a smaller elliptical curl 107 inside the tubular edge feature 54A is shown in FIG. 4a, and includes a "curl flange" 116 with associated thickness t, radius R11, and angle θ11 in order to further stabilize tubular edge 54A. For ratios of radius R11 to a thickness of 3.5 or less, and for angles θ11 between 30 and 120 degrees in the positive or negative direction, a special strengthening effect is obtained which causes the curl flange 116 to act together with tubular edge 54A so that the entire edge is substantially strengthened and stabilized against warping. This added stabilization is thus a very useful extension of the capabilities of the present invention.

As an alternative to the curl within a curl of FIG. 4a, FIG. 4b shows embodiment 113 having a lip 114 of length L11 which may be applied to the free edge of the curl 54b such as is shown in FIG. 4b. In this case the angle θ12 is between 30 and 120 degrees for best results, and the length L11 of lip 114 is between ⅕ and ⅘ of the average of edge tube dimensions L12 and L13 for best results. Longer lips may be used, but usually with limited additional benefits over the benefits of the range given.

Figure 6:
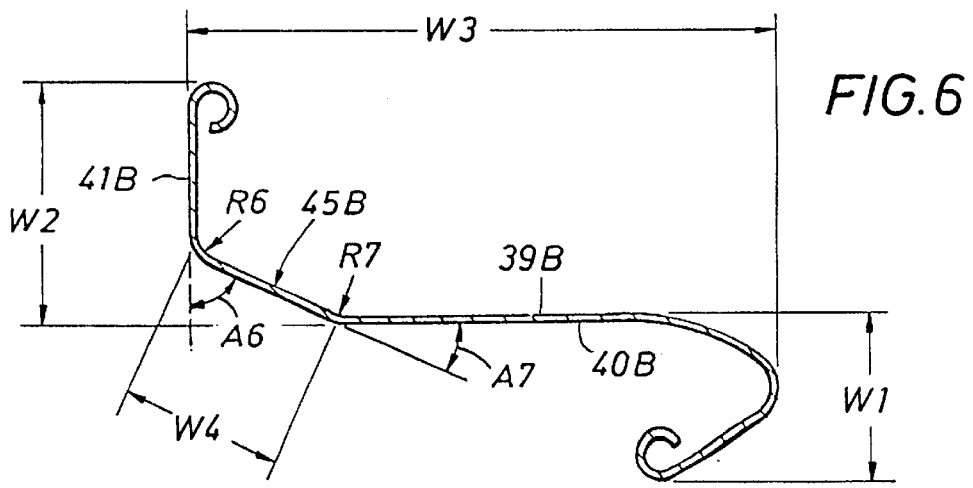
FIG. 6 is an enlarged section of a modified stiffener in which an intermediate interface flange of width W4 extends from the mounting flange at an angle and interfaces the next adjacent flange at an angle.

Referring now to FIG. 6, stiffener 39B is illustrated which is similar to stiffener 39 shown in FIG. 3 except for an intermediate connecting flange portion 45B extending between mounting flange 41B and body or web 40B. Connecting flange portion 45B extends at an angle A6 and radius R6 with respect to mounting flange 41B and at an angle A7 and radius R7 with respect to body 40B. Radius R6 and radius R7 are each less than 3.5 times the thickness of stiffener 39B for best results. Connecting flange portion 45B is of a width W4. Angles A6 and A7 are preferably at least about 25 degrees in a positive or negative direction for best results. Dimensions W1, W2, and W3 are similar to dimensions W1, W2, and W3 shown in FIG. 3. The length of W4 is generally smaller than the length of W3 for best results.

A typical aircraft panel may be of dimensions a being 9.5 inches and b being 20 inches. The stiffeners are preferably secured to the panel, each being made of aluminum and having a thickness of 0.032 inch with W1 and W2 being one inch and W3 being 3 inches. Diameter d is 3/16 inch and diameter d1 is ¼ inch. The fail-safe straps are of titanium, and have a thickness of 0.025 inches.

As a result of providing the inturned tubular beads or curls along the marginal edge portions of the stiffener, an unexpected significantly thinner gauge material generally about fifteen percent lighter has been utilized for the stiffener as compared with prior art panel stiffeners as utilized heretofore. By utilizing precise tubular beads as set forth herein on the selected members where it is most needed for strength, an airframer may utilize an unexpected substantially thinner gauge material while eliminating or minimizing problems encountered heretofore by prior art designs of stiffeners for aircraft panels such as those used in fuselages, empennages, and wings.

While the particular invention as herein shown and disclosed in detail is fully capable of obtaining the objects and providing the advantages hereinbefore stated, it is understood that this disclosure is merely illustrative of the presently preferred embodiments of the invention and that no limitations are intended other than as described in the appended claims.

What is claimed is:

1. An aircraft structural panel comprising:
   a sheet skin portion;
   an elongate stiffener secured to said sheet skin portion, said stiffener defining in cross section a web and a flange extending outwardly at each extreme of said web, each of the flanges having a free edge; and
   a tubular bead extending along the free edge of each flange for reinforcing said stiffener; wherein the tubular beads are inturned and of an elliptical cross section with a minor axis that is at least about 40 percent of the major axis.

2. An aircraft structural panel as defined in claim 1, wherein one of said flanges extends at right angels to said wed to define a mounting flange, and the other of said flanges is a bowed flange.

3. An aircraft structural panel as defined in claimed claim 2, wherein the width of said bowed flange and said mounting flange is each at least about two times the outer diameter of said tubular bead extending along the free edge of the respective flange.

4. An aircraft structural panel as defined in claim 1, wherein said inturned tubular beads are a circular cross-section and extend in a circular path of at least about 210 degrees.

5. An aircraft structural panel as defined in claim 3, wherein said web has a width between two times and seven times the width of said bowed flange and the width of said mounting flange.

6. The aircraft structural panel as defined in claim 1, wherein said inturned tubular beads are of a circular cross-section and extend in a circular path of at least about 270 degrees.

7. The aircraft structural panel as defined in claim 1, further comprising:
an intermediate connecting section between said web and one of said flanges, said connecting section extending from said web at an angle of at least about 25 degrees.

8. An aircraft structural panel comprising:
an aircraft panel skin having a curved shape and defining an inner surface and an outer surface;
a plurality of generally parallel elongate stringers each extending along the inner surface of said panel skin and extending outwardly from said panel skin;
a plurality of generally parallel elongate curved stiffeners each aligned to be substantially transverse to a longitudinal axis of an elongate stringer;
said stiffeners defining in cross section a web and a flange extending outwardly from each end of said web, each of the flanges having a free edge; and
a tubular bead extending along the free edge of each flange for reinforcing said stiffeners, wherein the tubular beads are inturned and of an elliptical cross section with a minor axis that is at least about 40 percent of the major axis.

9. An aircraft structural panel as defined in claim 8, further comprising;
a plurality of stringer ties extending between and secured to said stringers and said stiffeners.

10. An aircraft structural panel as defined in claim 8, further comprising;
a plurality of shear ties extending between and secured to said aircraft panel skin and said stiffeners.

11. An aircraft structural panel as defined in claim 10, wherein said shear ties are angle shaped having a pair of legs, one of said legs being secured to said aircraft panel skin and the other leg being secured to said stiffeners.

12. An aircraft structural panel as defined in claim 9, wherein at least one flange of each stiffener is planar and extends in a perpendicular relation to said web to define a mounting flange that is adjacent to said stringers.

13. An aircraft structural panel as defined in claim 9, wherein said stringer ties are generally channel shaped including a web and opposed flanges along the web, said web being secured to said stiffeners and said flanges are secured to said stringers.

14. An aircraft structural panel as defined in claim 11, wherein said shear ties are of a curved shape in conforming to the curved shape of said aircraft panel skin and are mounted between said stringers.

15. A structural panel for use on an aircraft fuselage comprising:
a plurality of generally parallel spaced elongate structural frames;
a plurality of generally parallel spaced stringers attached to said frames and extending in perpendicular relation to the longitudinal axes of said frames;
a skin extending over and attached to said frames and said stringers;
said frames defining in cross section a web and a flange extending outwardly at each end of said web, each of the flanges having a free edge; and
a tubular bead extending along the free edge of each flange for reinforcing said frames; wherein the tubular beads are inturned and of an elliptical cross section with a minor axis that is at least about 40 percent of the major axis.

16. An aircraft structural panel comprising:
a sheet skin portion;
an elongate stiffener secured to said sheet skin portion, said stiffener defining in cross section a web and a flange extending outwardly at each extreme of said web, each of the flanges having a free edge; and
a tubular bead extending along the free edge of each flange for reinforcing said stiffener, wherein each bead has a closed end to define an enclosed area; and a curled end portion of said bead extends within said enclosed area from said closed end to provide additional reinforcement.

17. The aircraft structural panel as defined in claim 16, wherein said curled end portion is of an elliptical cross section.

18. The aircraft structural panel as defined in claim 16, wherein said curled end portion includes a planar flange extending within said enclosed area.

19. An aircraft structural panel comprising:
an aircraft panel skin having a curved shape and defining an inner surface and an outer surface, a plurality of generally parallel elongate stringers extending along the inner surface of said panel skin;
a plurality of generally parallel elongate curved stiffeners aligned to be transverse to the longitudinal axes of said stringers;
said stiffeners defining in cross section a web and a flange extending outwardly from each end of said web, each of the flanges having a free edge; and
a tubular bead extending along the free edge of each flange for reinforcing said stiffener; wherein at least one of said flanges is a bowed flange.

20. A structural panel for use on an aircraft fuselage comprising:
a plurality of generally parallel spaced structural frames;
a plurality of generally parallel spaced stringers attached to said frames and extending in perpendicular relation thereto;
a skin extending over and attached to said frames and said stringers;
said frames defining in cross section a web and a flange extending outwardly at each end of said web, each of the flanges having a free edge; and
a tubular bead extending along the free edge of each flange for reinforcing said frames; wherein at least one of said flanges is a bowed flange.

21. An aircraft structural panel comprising:
a sheet skin portion;
an elongate stiffener secured to said sheet skin portion, said stiffener defining in cross section a web and a flange extending outwardly at each extreme of said web, each of the flanges having a free edge; and
a tubular bead extending along the free edge of each flange for reinforcing said stiffener wherein at least one of the tubular beads is inturned and of an elliptical cross section with a minor axis that is at least about 40 percent of the major axis.

22. The aircraft structural panel as defined in claim 21, further comprising;
an intermediate connecting section between said web and one of said flanges, said connecting section extending from said web at an angle of at least about 25 degrees.

* * * * *